United States Patent
Guo et al.

(10) Patent No.: US 11,945,995 B2
(45) Date of Patent: Apr. 2, 2024

(54) TEMPORARY PLUGGING AGENT AND PREPARATION METHOD THEREOF, AND METHOD FOR TEMPORARY PLUGGING AND FRACTURING OF HIGH-TEMPERATURE RESERVOIR

(71) Applicant: CHINA UNIVERSITY OF PETROLEUM, Dongying (CN)

(72) Inventors: Tiankui Guo, Dongying (CN); Yuelong Zhang, Dongying (CN); Zengbao Wang, Dongying (CN); Ning Qi, Dongying (CN); Mingliang Luo, Dongying (CN); Feipeng Wu, Dongying (CN); Ming Chen, Dongying (CN); Xiaoqiang Liu, Dongying (CN); Jiwei Wang, Dongying (CN); Xiaozhi Wang, Dongying (CN); Yuanzhi Gong, Dongying (CN)

(73) Assignee: CHINA UNIVERSITY OF PETROLEUM, Dongying (CN)

( * ) Notice: Subject to any disclaimer, the term of this patent is extended or adjusted under 35 U.S.C. 154(b) by 584 days.

(21) Appl. No.: 17/258,749

(22) PCT Filed: Dec. 15, 2020

(86) PCT No.: PCT/CN2020/136594
§ 371 (c)(1),
(2) Date: Jan. 8, 2021

(87) PCT Pub. No.: WO2021/196740
PCT Pub. Date: Oct. 7, 2021

(65) Prior Publication Data
US 2022/0195284 A1    Jun. 23, 2022

(30) Foreign Application Priority Data
Apr. 2, 2020 (CN) .......................... 202010257174.1

(51) Int. Cl.
*C09K 8/508* (2006.01)
*C09K 8/504* (2006.01)
(Continued)

(52) U.S. Cl.
CPC .......... *C09K 8/5083* (2013.01); *C09K 8/5045* (2013.01); *C09K 8/512* (2013.01); *E21B 43/261* (2013.01)

(58) Field of Classification Search
None
See application file for complete search history.

(56) References Cited

U.S. PATENT DOCUMENTS

| 11,421,140 B2 * | 8/2022 | Bai ........................... C08F 2/32 |
| 2015/0284625 A1 | 10/2015 | Silveira et al. |
| 2019/0119559 A1 * | 4/2019 | O'Toole ................. C09K 8/594 |

FOREIGN PATENT DOCUMENTS

| CN | 103408693 A | 11/2013 |
| CN | 104419390 A | 3/2015 |

(Continued)

OTHER PUBLICATIONS

Notification to Grant Patent Right for Invention in counterpart Chinese Application No. 202010257174.1, dated Apr. 26, 2021.

(Continued)

*Primary Examiner* — John J Figueroa (57) ABSTRACT

Disclosed are a temporary plugging agent and a preparation method thereof, and a method for temporary plugging and fracturing of a high-temperature reservoir. The temporary plugging agent includes the following components in mass fractions: acrylamide 5%, composite crosslinking agent 1%, laponite 1%, ammonium persulfate 0.1% and water 92.9%.

9 Claims, 6 Drawing Sheets

(51) Int. Cl.
*C09K 8/512* (2006.01)
*E21B 43/26* (2006.01)

(56) References Cited

FOREIGN PATENT DOCUMENTS

| | | | |
|---|---|---|---|
| CN | 104531115 A | 4/2015 |
| CN | 105041261 A | 11/2015 |
| CN | 105089596 A | 11/2015 |
| CN | 105863595 A | 8/2016 |
| CN | 107011879 A | 8/2017 |
| CN | 108825196 A | 11/2018 |
| CN | 109054788 A | 12/2018 |
| CN | 109252844 A | 1/2019 |
| CN | 109296350 A | 2/2019 |
| CN | 109458168 A | 3/2019 |
| CN | 1110003870 A | 7/2019 |
| CN | 110079286 A | 8/2019 |
| CN | 110540831 A | 12/2019 |
| CN | 110669484 A | 1/2020 |
| CN | 110804427 A | 2/2020 |
| CN | 111303849 A | 6/2020 |

OTHER PUBLICATIONS

Chang Dong-Mei, Hu Lang, Qi He-Dong, Guo Li-Mei, "Preparation and characterization of water-swelling temporary plugging agent", Applied Chemical Industry, Jan. 2018, vol. 47, No. 1, pp. 36-39.
Wu Xuanyu, Ren Xiaojuan, Li Pan, Lei Zhe, "Preparation and Performance Study of TP-2 Drilling Fluid Plugging Agent with Swellable Particle for Fractured Reservoir", Oilfield Chemistry, Jun. 25, 2016, vol. 33, No. 2, pp. 191-194.
Feng Yan, Xinping Zhang, Huihui Ren, Xiaohui Meng, Dong Qiu, "Reinforcement of polyacrylamide hydrogel with patched laponite-polymer composite particles", Colloids and Surfaces A, 529 (2017), pp. 268-273.
Chang Dong-Mei, Qi He-Dong, Guo Li-Mei, "Preparation and characterization of Degradable Temporary Plugging Agent for Reservoir Reconstruction", Fine Chemicals, Oct. 2018, vol. 35, No. 10, pp. 1745-1750.
First Office Action in counterpart Chinese Application No. 202010257174.1, dated Jan. 20, 2021.
International Search Report in corresponding PCT Application No. PCT/CN2020/136594, dated Mar. 8, 2021 and Written Opinion of the International Searching Authority in corresponding PCT Application No. PCT/CN2020/136594, dated Mar. 8, 2021.

* cited by examiner

(a) 1mPa·s (b) 10mPa·s (c) 20mPa·s

TEMPORARY PLUGGING AGENT AND PREPARATION METHOD THEREOF, AND METHOD FOR TEMPORARY PLUGGING AND FRACTURING OF HIGH-TEMPERATURE RESERVOIR

CROSS-REFERENCE TO RELATED APPLICATIONS

This application is a National Stage of International Application No. PCT/CN2020/136594, filed on Dec. 15, 2020, which claims priority to Chinese Application No. 202010257174.1, filed on Apr. 2, 2020, the entire disclosure of which is incorporated herein by reference.

TECHNICAL FIELD

The present disclosure relates to the technical field of oil and gas exploration, in particular to the technical field of oil well reservoir temporary plugging and fracturing, and specially to a temporary plugging agent and a preparation method thereof, and a method for temporary plugging and fracturing of a high-temperature reservoir.

BACKGROUND

With the deepening of oil and gas exploration and development, the hard-to-produce reserves continue to increase. Nowadays, the main targets of our country's oil and gas field development are gradually shifting to deep, unconventional oil and gas reservoirs. Increasing production of low-porosity and low-permeability sandstone reservoirs, heterogeneous carbonate reservoirs, and deep oil and gas reservoirs have become the main work content. For example, the Ordovician carbonate reservoir in Shunbei Oilfield of China has a depth of more than 5000 m, a high temperature of 160° C. and a reservoir thickness of more than 100 m. If the conventional acid fracturing technology is adopted, it faces with not only the high-risk problem of ultra-deep drilling, but also the difficulty of effectively transforming thick layers above 100 m, which is difficult to achieve safe and efficient commercial exploitation of this type of reservoir. For this reason, a novel fracturing technology is needed. When the drill reaches the top of the reservoir (the junction of the upper barrier), a floating agent is applied to restrain the fracture from spreading upward through the layer and a temporary plugging agent is pumped to the front of the fracture to limit a length of the fracture, thereby realizing the large downward expansion of fracturing fracture (over 100 m), increasing the probability of communicating with hydrocarbon-rich fracture and cave, and completing the safe and efficient reconstruction of huge thick reservoir.

Efficient transformation of the special reservoir has new requirements on the performance of temporary plugging agents. China has successfully developed a variety of clean steering materials including fibers, pellets, etc., equipped with special material adding device or equipment, and initially formed its process optimization method, which was successfully applied on site. At present, the main problem of fiber temporary plugging is the limited pressure bearing capacity, while the composite steering material has higher plugging efficiency and pressure bearing capacity for fractures. Fiber is easy to plug when added, but it is not easy to be transported long-distance due to winding restrictions, which makes it easy to plug and steer around the wellbore. There are few experimental studies on temporary plugging and fracturing with pure particles in fractures, especially for temporary plugging materials under high temperature conditions, and the research on the optimization design of process schemes for particle temporary plugging is not comprehensive. In view of this situation, there is an urgent need for a temporary plugging material with high temperature resistance, good plugging performance and easily degradable.

SUMMARY

The main objective of the present disclosure is to provide a temporary plugging agent and a preparation method thereof, and a method for temporary plugging and fracturing of a high-temperature reservoir, which aims to provide a temporary plugging agent with high temperature resistance, good plugging performance, and easy degradation.

In order to achieve the above objective, the present disclosure provides a temporary plugging agent, including the following components in mass fractions:

acrylamide 5%, composite crosslinking agent 1%, laponite 1%, ammonium persulfate 0.1% and water 92.9%.

In an embodiment, the composite crosslinking agent includes polyethylene glycol diacrylate and N,N-methylenebisacrylamide.

In an embodiment, a mass ratio of the polyethylene glycol diacrylate and the N,N-methylenebisacrylamide is 5:2.

The present disclosure further provides a method for preparing the temporary plugging agent described above, including the following operations:

adding laponite to water and stirring until the laponite is completely dissolved, adding acrylamide and stirring until the acrylamide is completely dissolved, adding composite crosslinking agent and stirring until the composite crosslinking agent is completely dissolved, adding ammonium persulfate and stirring until the ammonium persulfate is completely dissolved to obtain a mixture; and stirring and reacting the mixture at 40° C. until the mixture is gelatinous, and taking out and air-drying the mixture at 40° C. for 24 to 48 hours and then granulating to prepare the temporary plugging agent.

The present disclosure further provides a method for temporary plugging and fracturing of a high temperature reservoir, including the following operations:

injecting the temporary plugging agent described above into a fracture of the high temperature reservoir, and forming a plugging baffle at a front end of the fracture to make the fracture steering and extending, to perform steering and fracturing on the high temperature reservoir.

In an embodiment, a carrier fluid of the temporary plugging agent is slippery water.

In an embodiment, a viscosity of the slippery water is 1 mPa·s to 10 mPa·s.

In an embodiment, a particle size of the temporary plugging agent is 40 mesh to 180 mesh.

In an embodiment, the temporary plugging agent includes temporary plugging agent particles with a particle size of 40-60 mesh and a particle size of 160-180 mesh, a mass ratio of temporary plugging agent particles with the particle size of 40-60 mesh to temporary plugging agent particles with the particle size of 160-180 mesh is 1:1.3, the temporary plugging agent particles with the particle size of 40-60 mesh are injected first, and the temporary plugging agent particles with the particle size of 160-180 mesh are injected later.

In an embodiment, an injection concentration of the temporary plugging agent is 3% to 4%.

In technical solutions of the present disclosure, the temporary plugging agent is made of acrylamide, composite crosslinking agent, laponite, ammonium persulfate and water, which is suitable for the temporary plugging and fracturing of high temperature reservoirs of oil well. It has excellent plugging performance at high temperatures, can withstand high temperatures of 160° C., and has a suitable degradation rate, which can ensure sufficient construction time and achieve a 100% degradation rate, avoiding problems such as pollution to the reservoir.

BRIEF DESCRIPTION OF THE DRAWINGS

In order to more clearly illustrate the embodiments of the present disclosure, drawings used in the embodiments will be briefly described below. Obviously, the drawings in the following description are only some embodiments of the present disclosure. It will be apparent to those skilled in the art that other figures can be obtained according to the structures shown in the drawings without creative work.

The realization of the objective, functional characteristics, and advantages of the present disclosure are further described with reference to the accompanying drawings.

DETAILED DESCRIPTION OF THE EMBODIMENTS

To make the objectives, technical solutions, and advantages of the embodiments of the present disclosure clearer, the technical solutions in the embodiments of the present disclosure will be described clearly and completely below. If specific conditions are not indicated in the examples, it shall be carried out in accordance with conventional conditions or conditions recommended by the manufacturer. The reagents or instruments used without the manufacturer's indication are all conventional products that can be purchased commercially.

China has successfully developed a variety of clean steering materials including fibers, pellets, etc., equipped with special material adding device or equipment, and initially formed its process optimization method, which was successfully applied on site. At present, the main problem of fiber temporary plugging is the limited pressure bearing capacity, while the composite steering material has higher plugging efficiency and pressure bearing capacity for fractures. Fiber is easy to be plugged when added, but it is not easy to transport long-distance due to winding restrictions, which makes it easy to steer around the wellbore. There are few experimental studies on temporary plugging and fracturing with pure particles in fractures, especially for temporary plugging materials under high temperature conditions, and the research on the optimization design of process schemes for particle temporary plugging is not comprehensive. In view of this situation, there is an urgent need for a temporary plugging material with high temperature resistance, good plugging performance and easily degradable.

In view of this, the present disclosure provides a temporary plugging agent, including the following components in mass fractions: acrylamide 5%, composite crosslinking agent 1%, laponite 1%, ammonium persulfate 0.1% and water 92.9%.

In technical solutions of the present disclosure, the temporary plugging agent is made of acrylamide, composite crosslinking agent, laponite, ammonium persulfate and water, which is suitable for the temporary plugging and fracturing of high temperature reservoirs of oil well. It has excellent plugging performance at high temperatures, it can withstand high temperatures of 160° C., degrade after 6 h at the temperature of 160° C. and achieve a 100% degradation rate after 12 h, and has a suitable degradation rate, which can ensure sufficient construction time and achieve a 100% degradation rate, avoiding problems such as pollution to the reservoir.

Figure 1:
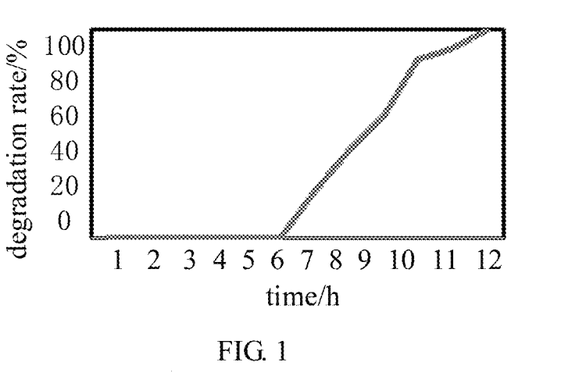
FIG. 1 is a mass multiple curve of a temporary plugging agent provided by the present disclosure after absorbing water and expanding at different temperatures.
Figure 2:
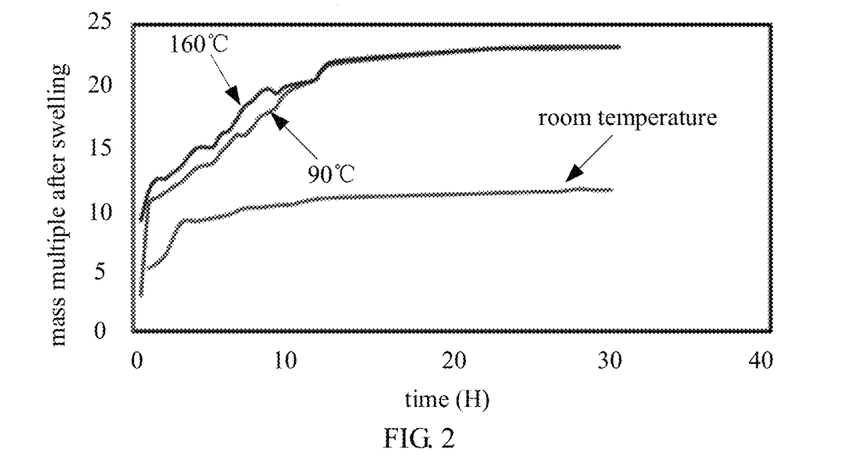
FIG. 2 is a degradation curve of the temporary plugging agent provided by the present disclosure at 160° C.

Laponite (lithium magnesium silicate) is a synthetic tri-octahedral layered colloidal material. Laponite has very strong gel-forming properties in water systems, and has excellent thixotropy, dispersibility, suspension and thickening properties. Laponite added to water can quickly swell to form a gel containing a large amount of water network structure. Choosing laponite as one of the raw materials of the temporary plugging agent is beneficial to improve the expansion ratio and plugging performance of the temporary plugging agent. Further, the composite crosslinking agent includes polyethylene glycol diacrylate and N,N-methylenebisacrylamide. The mass ratio of the polyethylene glycol diacrylate and N,N-methylenebisacrylamide may not be limited. In an embodiment of the present disclosure, the mass ratio of the polyethylene glycol diacrylate and N,N-methylenebisacrylamide is 5:2. The resulted temporary plugging agent has excellent temporary plugging performance, and the mass multiple curve after absorbing water and swelling at different temperatures is shown in FIG. 1. The mass multiple after absorbing water and swelling at 90° C. and 160° C. is about 2 times of that at room temperature, and the volume multiple can reach up to about 2 times. In addition, the temporary plugging agent can self-degrade under high temperature conditions in either water or oil. The degradation curve at 160° C. is shown in FIG. 2. The degradation rate within 6 h is 0, which can ensure sufficient construction time. The degradation rate can reach 100% after 12 hours to avoid pollution to the reservoir.

Figure 3:
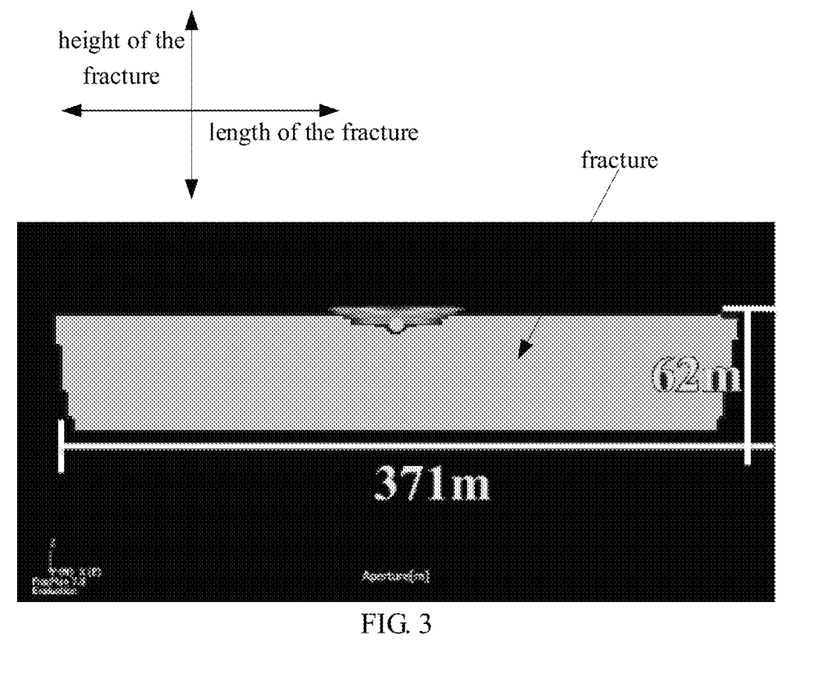
FIG. 3 is a cross-sectional view of expansion morphology of fractures without the temporary plugging agent.
Figure 4:
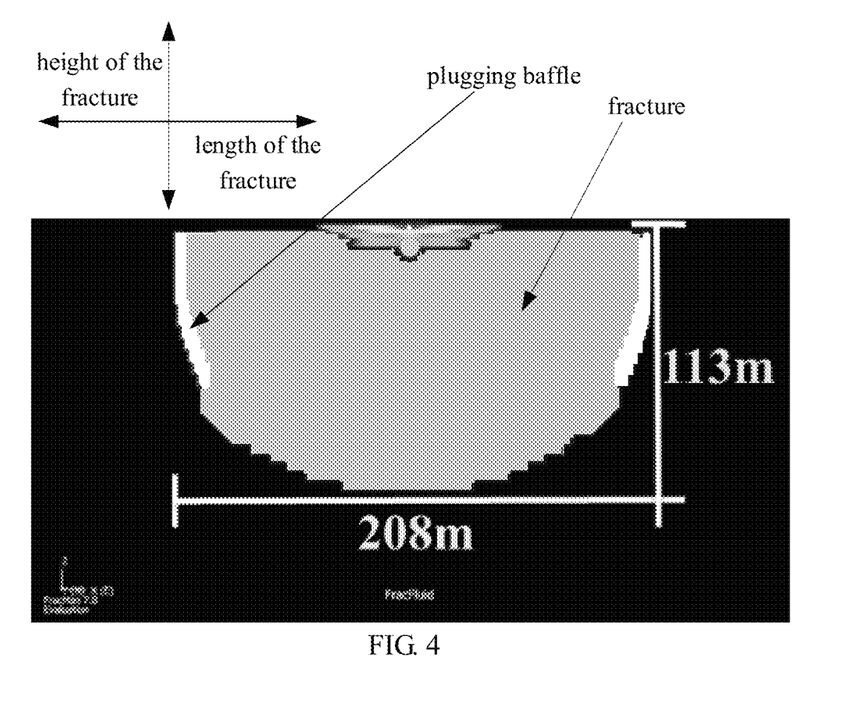
FIG. 4 is a cross-sectional view of expansion morphology of fractures with the temporary plugging agent of the present disclosure to plug fracturing.

FIG. 3 and FIG. 4 show the comparison results of fracture expansion morphology of different fracturing processes under the same fracturing scale (609.5 m³) (simulated using FRACMAN software). FIG. 3 is a cross-sectional view of the expansion morphology of fractures without temporary plugging agent. FIG. 4 is a cross-sectional view of the expansion morphology of fractures with the temporary plugging agent of the present disclosure to plug fracturing. It can be seen from FIG. 3 and FIG. 4 that when there is no temporary plugging agent, the fractures extend laterally, the length of the fracture reaches 371 m, and the maximum height of the fracture is only 62 m. When using the temporary plugging agent of the present disclosure, after the fracture is extended in the transverse direction to the place where a plugging baffle is formed, it turns to extend towards the height of the fracture, the length of the fracture is restrained and shortened to 208 m, while the height of the fracture fully extends downward to 113 m. It shows that the temporary plugging agent of the present disclosure can effectively realize the temporary plugging and turning to fracturing (it should be noted that this test also adds a floating agent to form a plugging baffle on the upper part of the fracture, so the fracture will not extend upward).

The present disclosure further provides a method for preparing the temporary plugging agent as described above, including the following operations:

Operation S10, adding laponite to water and stirring until the laponite is completely dissolved, adding acrylamide and stirring until the acrylamide is completely dissolved, adding composite crosslinking agent and stirring until the composite crosslinking agent is completely dissolved, adding ammonium persulfate and stirring until the ammonium persulfate is completely dissolved to obtain a mixture;

Operation S12, stirring and reacting the mixture at 40° C. until the mixture is gelatinous, and taking out and air-drying the mixture at 40° C. for 24 to 48 hours and then granulating to prepare the temporary plugging agent.

Take the preparation of 300 mL temporary plugging agent in the laboratory as an example. First prepare 279 g of water, use a mixer to continue stirring, slowly and evenly add laponite to the water in batches. After the laponite added first is fully dissolved, continue to add the next part until all laponite is completely dissolved, then add acrylamide, the addition method is the same as that of laponite. Then add the composite crosslinking agent in the same way as laponite. Finally, add ammonium persulfate, stir well for a period of time, until all the materials are evenly mixed, put it in a 40° C. water bath for full reaction. During the reaction, the solution will slowly become viscous. After it is fully reacted to be gelatinous, take it out and place it on the plastic wrap and cut into strips. Then put it into the air-drying box at 40° C. for 24~48 h, and then granulate to obtain temporary plugging agent granules.

Further, the present disclosure provides a method for using the temporary plugging agent as described above to perform temporary plugging and fracturing of high temperature reservoirs, including the following operations: injecting the temporary plugging agent as described above into the fracture of the high temperature reservoir to form a plugging baffle at the front end of the fracture, such that the fracture is turned to extend, to fracture the high temperature reservoir. It should be noted that in the present disclosure, when the drill reaches the top of the reservoir (the junction of the upper barrier), a floating agent is also applied to form a plugging baffle at the upper end of the fracture to prevent the fracture from spreading upward through the layer. In addition, the method for using the temporary plugging agent to perform temporary plugging and fracturing of high temperature reservoirs provided by the present disclosure does not limit the direction of temporary plugging steering. In actual fracturing, the temporary plugging agent can be used to form a temporary plugging baffle in a direction that does not require the extension of the fracture. For ease of description, the temporary plugging agent is used to limit the extension of the fracture in the length direction and to promote it to extend toward the height of the fracture as an example.

In order to achieve efficient reservoir reconstruction, in addition to a temporary plugging agent with excellent performance, a corresponding set of construction technology is also required, including the optimization of parameters such as optimal matching particle size, effective plugging thickness and pump injection technology, this is the missing part of the current research, especially the process of achieving vertical fracture expansion through temporary plugging of fracture ends. In response to this situation, based on a large-scale visual particle migration simulation device, the evaluation experiment of the plugging strength of the granular temporary plugging agent in the fracture is carried out, combined with the numerical simulation of the microscopic migration of the temporary plugging agent based on the CFD-DEM method, which clarifies the particle size ratio relationship, fracturing fluid parameters and effective plugging thickness. The optimization of the temporary plugging agent pump injection process based on Meyer software was carried out, and the pump injection process parameters for establishing a high-strength front-end temporary plugging agent diaphragm were clarified. The specific instructions are as follows:

During the process of using the temporary plugging agent of the present disclosure to temporarily plug and turn to fracturing a high temperature reservoir, slick water is selected as the carrier fluid, which has the characteristics of high efficiency and low cost. The present disclosure has tested the effect of the temporary plugging agent's suspending ability in the fracturing fluid, and its suspension performance is good. No drop occurs under the experimental displacement conditions greater than 3 $m^3/h$, but the large displacement is conducive to the remote delivery of the temporary plugging agent. Therefore, it is recommended that the site displacement is greater than 6 $m^3/h$, but it is recommended that the displacement not be higher than 15 $m^3/h$, otherwise the temporary plugging agent will easily enter the lower part of the fracture and prevent the fracture from expanding downward.

Figure 5:
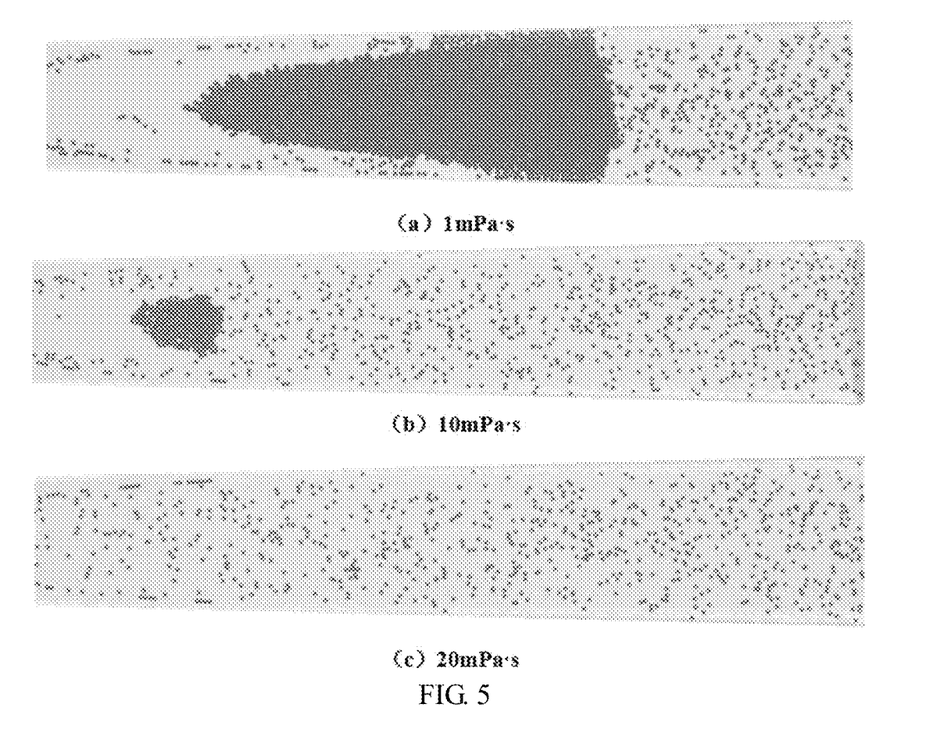
FIG. 5 shows a placement of the temporary plugging agent under different fracturing fluid viscosities.

CFD-DEM is further used to carry out the numerical simulation of the microscopic migration of temporary plugging agent. FIG. 5 shows the placement of temporary plugging agent under different fracturing fluid viscosities (the gray particles in FIG. 5 are temporary plugging agent particles). It can be seen from FIG. 5 that as the viscosity of the sand-carrying liquid increases, the paving thickness decreases and the paving concentration decreases. As the viscosity of the sand-carrying liquid increases, the fracture width increases. Since the higher the viscosity, the easier it is to carry the temporary plugging agent to the front of the fracture, but the higher viscosity will also increase the width of the fracture, resulting in a decrease in the paving concentration. Therefore, the viscosity of the sand-carrying liquid is preferably within the range of 1-10 mPa·s, it is recommended that the carrier fluid should be a low-viscosity slick fracturing fluid with a viscosity of 1-10 mPa·s, which has good front edge paving effect, high paving concentration, and low cost.

Figure 6:
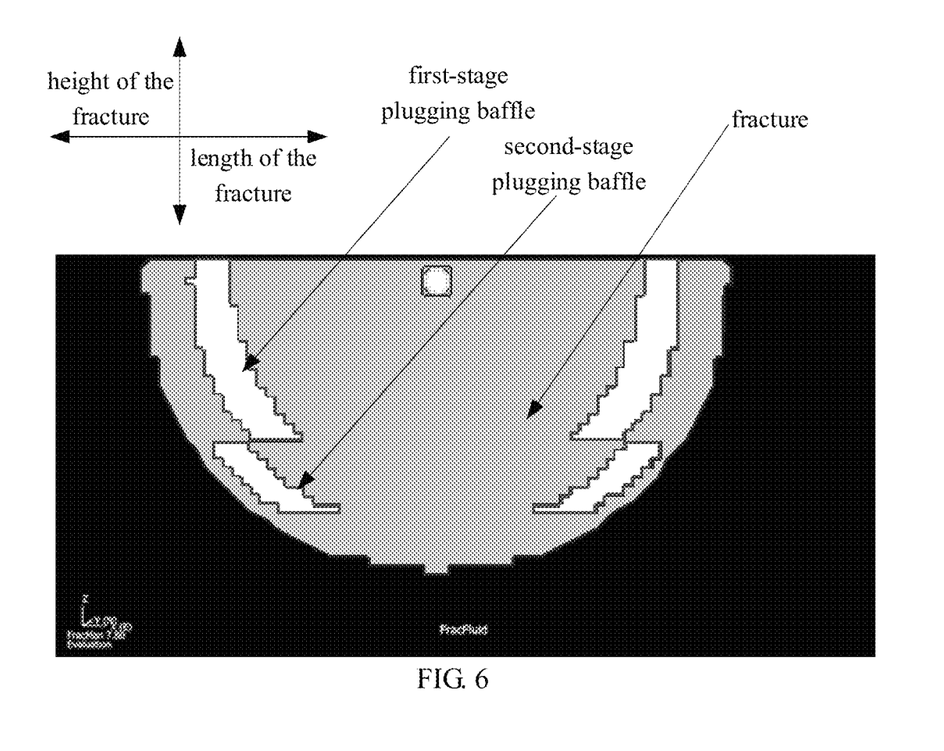
FIG. 6 is a simulation diagram of fracture expansion with the temporary plugging agent provided by the present disclosure for staged injection.

The present disclosure also optimizes the particle size ratio and effective plugging thickness of the temporary plugging agent particles. The particle size of the temporary plugging agent particles is preferably 40-180 mesh, and is further optimized as follows: the temporary plugging agent includes temporary plugging agent particles with a particle size of 40-60 mesh and a particle size of 160-180 mesh. The present disclosure chooses to inject the temporary plugging agent in stages. After the first stage is injected to form the plugging baffle, the second stage is injected at the front end of the first-stage plugging baffle to form the plugging baffle again. In this way, the fracturing that continues to extend in the original direction beyond the front end of the first-stage plugging baffle is continued to be plugged, so that the fracturing can be redirected to extend, thereby improving the plugging effect and ensuring that the fracturing with a fracture height of more than 100 m is obtained. When the second stage is ⅓ and ⅔ of the circumscribed circle of the first stage, the plugging effect is close to that of non-graded injection. Specifically, the mass ratio of temporary plugging agent particles with a particle size of 40-60 mesh to temporary plugging agent particles with a particle size of 160-180 mesh is 1:1.3, and the temporary plugging agent particles with a particle size of 40-60 mesh are injected first, and the temporary plugging agent particles with a particle size of 160-180 mesh are injected later. FRACMAN software is used to simulate the fracture expansion of temporary plugging agent fracturing on the fracturing results of stage injection, and the simulation result is shown in FIG. 6. The temporary plugging agent of large particle size is first injected to form the first-stage plugging baffle, and then the temporary plugging agent of small particle size is injected into the front end of the first plugging baffle to form the second-stage plugging baffle, which improves the plugging effect of the temporary plugging agent.

After clarifying the effective matching particle size of the temporary plugging agent, the plugging pressure test under different filling thickness conditions was carried out. The results are shown in Table 1 below. As the thickness of the baffle increases, the effective plugging pressure gradually increases, but the relationship is nonlinear. After fitting the data, the relationship between the baffle thickness x and the effective plugging pressure y is: $y=0.0339x^2+0.3533x-1.5677$. During the actual operation process, the relevant process parameters can be set according to actual needs with reference to Table 1 and this relational expression. For an effective plugging pressure of 10 MPa, the present disclosure suggests that the thickness of the baffle is not less than 14 cm.

TABLE 1

Effective plugging pressure test results of different baffle thicknesses

| mesh ratio | baffle thickness/cm | effective plugging pressure/MPa |
|---|---|---|
| 0.5 g 40-60 mesh: 0.7 g 160-180 mesh = 1:1.3 | 3.1 | 0.2 |
| 0.8 g 40-60 mesh: 1.0 g 160-180 mesh = 1:1.3 | 4.5 | 0.6 |
| 1.0 g 40-60 mesh: 1.3 g 160-180 mesh = 1:1.3 | 5.8 | 1.6 |
| 1.5 g 40-60 mesh: 2.0 g 160-180 mesh = 1:1.3 | 8.4 | 3.1 |
| 2.0 g 40-60 mesh: 2.6 g 160-180 mesh = 1:1.3 | 11.2 | 6.3 |
| 2.5 g 40-60 mesh: 3.3 g 160-180 mesh = 1:1.3 | 13.6 | 10.8 |
| 3.0 g 40-60 mesh: 3.9 g 160-180 mesh = 1:1.3 | 17.5 | 14.5 |

Figure 7:
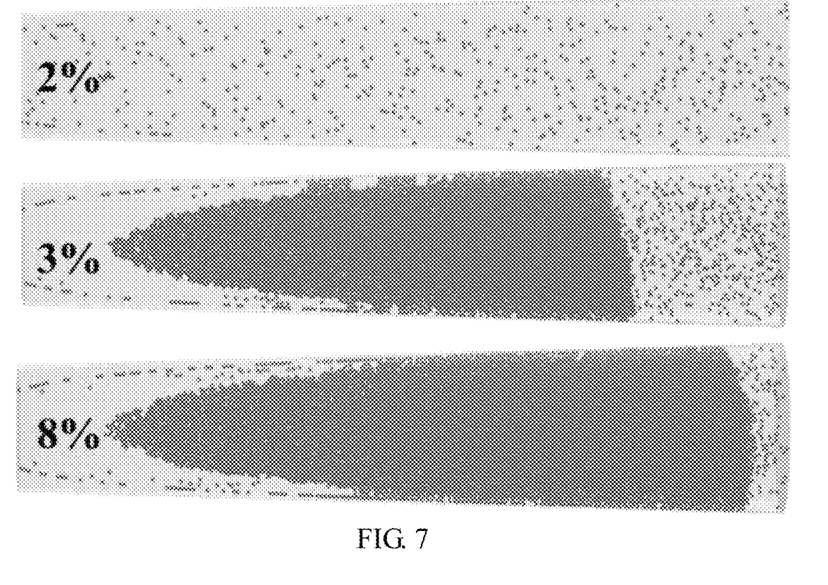
FIG. 7 shows a placement of temporary plugging agent at different concentrations.

The present disclosure also optimizes the injection concentration of the temporary plugging agent. FIG. 7 shows the placement of temporary plugging agent at different concentrations (the gray particles in FIG. 7 are temporary plugging agent particles), and the optimization result is that the injection concentration of the temporary plugging agent is best at 3 to 4%.

During the operation, the temporary plugging agent was excellent in carrying capacity in the wellbore, and programmed testing was carried out, and the particle carrying situation under different conditions was summarized as a reference. The particle size is set to be 0.83 mm, fracturing fluid density is 1100 kg/m³, fracturing fluid viscosity is 1 mPa·s, the diameter of the wellbore is 0.0889 m, assuming the well depth is 5000 m, and the fracturing fluid displacement is 5 m³/min, which is 13.4 m/s. When the particle density is in the range of 200-900 kg/m³, the time difference between the plugging agent and the fracturing fluid reaching the bottom of the well is 1.85-3.95 s; the specific data is shown in Table 2.

TABLE 2

Carrying situation of temporary plugging agent particles under different conditions

| particle density (Kg/m³) | critical flow rate (m/s) | particle flow rate (m/s) | time for fracturing fluid to reach bottom of the well (s) | time for particle to reach bottom of the well (s) | time difference (s) |
|---|---|---|---|---|---|
| 200 | 0.1404 | 13.26 | 373.13 | 377.09 | 3.95 |
| 300 | 0.1323 | 13.27 | 373.13 | 376.86 | 3.72 |
| 400 | 0.1238 | 13.28 | 373.13 | 376.61 | 3.48 |
| 500 | 0.1146 | 13.29 | 373.13 | 376.35 | 3.22 |
| 600 | 0.1046 | 13.30 | 373.13 | 376.07 | 2.94 |
| 700 | 0.0936 | 13.31 | 373.13 | 375.76 | 2.63 |
| 800 | 0.0810 | 13.32 | 373.13 | 375.41 | 2.27 |
| 900 | 0.0662 | 13.33 | 373.13 | 374.99 | 1.85 |

Considering that the injection of working fluid will cool down the wellbore and fractures, the present disclosure further uses matlab programming to control the comsol solver to simulate the temperature changes of the wellbore and fractures during operation, and the simulated formation depth is 6000 m. The simulation result is: when the flow rate is 6 m³/min, the fracturing operation is 1 h, and the temperature of the bottom of the well drops from 180° C. to 60° C. When the flow rate is 6 m³/min, the fracturing operation is 1 h, and the temperature at the fracture end drops from 160° C. to 120° C. When the flow rate is 12 m³/min, the fracturing operation is 1 h, and the temperature at the end of the fracture drops from 160° C. to 90° C.

In the present disclosure, a single fracture with a half-fracture length of 120 m and a certain paving concentration is established in the Meyer software, the thickness of the reservoir is 100 m, the thickness of the upper reservoir is 20 m, and the thickness of the lower reservoir is 20 m. The permeability is 0.1 md, the density of the temporary plugging agent is 1 g/cm³, and the total liquid volume is 200 m³. The temporary plugging agent occupies 2% of the total liquid mass, which is about 4000 kg. The present disclosure separately optimizes the staged liquid volume distribution, pumping rate, sand-carrying liquid viscosity, and temporary plugging agent particle size for perforation thicknesses of 20 m, 50 m, and 80 m. The test results are as follows:

(1) In order to achieve a good front edge paving effect of the temporary plugging agent with a thickness of 20 m perforation, it is recommended that the pumping rate of prepad fluid is 2.1 m³/min, the pumping rate of temporary plugging agent is 2~5 m³/min, and the pumping rate of displacement fluid is 3 m³/min; the prepad fluid is 20 m³, the temporary plugging agent is 40 m³, the displacement fluid is 140 m³, the viscosity of the sand-carrying liquid is within the range of 1-10 mPa·s, the particle size of the temporary plugging agent is 30-50 mesh, and the density of the temporary plugging agent is about 1 g/cm³.

(2) In order to achieve a good front edge paving effect of the temporary plugging agent with a thickness of 50 m perforation, it is recommended that the pumping rate of prepad fluid is 2.1 m³/min, the pumping rate of temporary plugging agent is 4~7 m³/min, and the pumping rate of displacement fluid is 3 m³/min; the prepad fluid is 50 m³, the temporary plugging agent is 100 m³, the displacement fluid is 350 m³.

(3) In order to achieve a good front edge paving effect of the temporary plugging agent with a thickness of 80 m perforation, it is recommended that the pumping rate of prepad fluid is 2.5 m³/min, the pumping rate of temporary plugging agent is 3~7 m³/min, and the pumping rate of displacement fluid is 4 m³/min; the prepad fluid is 80 m³, the temporary plugging agent is 160 m³, the displacement fluid is 560 m³.

The temporary plugging agent of the present disclosure is aimed at the difficulties of on-site construction, especially suitable for on-site reservoirs located at 5000 m underground, the reservoir temperature reaches 160° C., and the reservoir thickness reaches 100 m. For this kind of reservoir, in order to increase the probability of communicating with oil and gas-rich fractures and caves, and complete safe and efficient transformation, the present disclosure provides an optimization of process parameters for the substantial expansion of the lower fracture height. The present disclosure has designed a fracture morphology construction plan with a target half-fracture length and a height of the fracture of about 100 m. The specific temporary plugging fracturing pump injection program design is shown in Table 3 (based on the fracturing results of the pump injection process, the FRACMAN software was used to perform the numerical simulation of the temporary plugging agent fracturing fracture expansion. The simulation results are shown in FIG. 6).

TABLE 3

Temporary plugging fracturing pump injection program

| scheme | sequence | time (min) | displacement (m³/min) | fracturing fluid | mesh of temporary plugging agent | amount of temporary plugging agent (Kg) | note |
|---|---|---|---|---|---|---|---|
| fracturing scale 596 m³ | 1 | 10 | 3 | slippery water | | | first fracturing |
| | 2 | 0.7 | 9 | temporary plugging agent | 40~60 | 170 | concentration 3% |
| | 3 | 0.8 | 9 | temporary plugging agent | 160~180 | 222 | concentration 3% |
| | 4 | 15 | 12 | slippery water | | | secondary expansion |
| | 5 | 0.7 | 9 | temporary plugging agent | 40~60 | 170 | concentration 3% |
| | 6 | 0.8 | 9 | temporary plugging agent | 160~180 | 222 | concentration 3% |
| | 7 | 30 | 12 | slippery water | | | third expansion |

Besides, natural fractures in tight sandstone reservoirs are not developed, and it is not easy to form multiple fractures in fracturing, and the temporary plugging steering technology provided in the present disclosure can also be applied. Therefore, the present disclosure has also tested the application of temporary plugging agent in tight sandstone temporary plugging and fracturing. The maximum horizontal principal stress and the minimum horizontal principal stress of the selected reservoir are 45 MPa and 40 MPa respectively, and the reservoir thickness of 20 m is temporarily plugged and turned to fracturing. The paving thickness of the temporary plugging agent is 12 cm, which can withstand a pressure of 6 MPa and can realize fracture steering. According to the optimization of pump injection parameters, the present disclosure has designed a set of construction schemes, as shown in Table 4.

TABLE 4

Tight sandstone temporary plugging steering fracturing pump injection program

| scheme | sequence | time (min) | displacement (m³/min) | fracturing fluid | mesh of temporary plugging agent | amount of temporary plugging agent (Kg) | note |
|---|---|---|---|---|---|---|---|
| fracturing scale 596 m³ | 1 | 7 | 3 | slippery water | | | first fracturing |
| | 2 | 0.15 | 9 | temporary plugging agent | 40~60 | 42 | concentration 3% |

TABLE 4-continued

Tight sandstone temporary plugging steering fracturing pump injection program

| scheme | sequence | time (min) | displacement (m³/min) | fracturing fluid | mesh of temporary plugging agent | amount of temporary plugging agent (Kg) | note |
|---|---|---|---|---|---|---|---|
| | 3 | 0.2 | 9 | temporary plugging agent | 160~180 | 54 | concentration 3% |
| | 4 | 15 | 12 | slippery water | | | secondary expansion |

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A temporary plugging agent, comprising the following components in mass fractions:
    acrylamide 5%, composite crosslinking agent 1%, laponite 1%, ammonium persulfate 0.1% and water 92.9%;
    wherein the composite crosslinking agent comprises polyethylene glycol diacrylate and N,N-methylenebisacrylamide.

2. The temporary plugging agent of claim 1, wherein a mass ratio of the polyethylene glycol diacrylate and the N,N-methylenebisacrylamide is 5:2.

3. A method for preparing the temporary plugging agent of claim 1, comprising the following operations:
    adding laponite to water and stirring until the laponite is completely dissolved, adding acrylamide and stirring until the acrylamide is completely dissolved, adding composite crosslinking agent and stirring until the composite crosslinking agent is completely dissolved, adding ammonium persulfate and stirring until the ammonium persulfate is completely dissolved to obtain a mixture; and
    stirring and reacting the mixture at 40° C. until the mixture is gelatinous, and taking out and air-drying the mixture at 40° C. for 24 to 48 hours and then granulating to prepare the temporary plugging agent.

4. A method for temporary plugging and fracturing of a high temperature reservoir, comprising the following operations:
    injecting the temporary plugging agent of claim 1 into a fracture of the high temperature reservoir, and forming a plugging baffle at a front end of the fracture to make the fracture steering and extending, to perform steering and fracturing on the high temperature reservoir.

5. The method of claim 4, wherein a carrier fluid of the temporary plugging agent is slippery water.

6. The method of claim 5, wherein a viscosity of the slippery water is 1 mPa·s to 10 mPa·s.

7. The method of claim 4, wherein a particle size of the temporary plugging agent is 40 mesh to 180 mesh.

8. The method of claim 7, wherein the temporary plugging agent includes temporary plugging agent particles with a particle size of 40-60 mesh and a particle size of 160-180 mesh, a mass ratio of temporary plugging agent particles with the particle size of 40-60 mesh to temporary plugging agent particles with the particle size of 160-180 mesh is 1:1.3, the temporary plugging agent particles with the particle size of 40-60 mesh are injected first, and the temporary plugging agent particles with the particle size of 160-180 mesh are injected later.

9. The method of claim 4, wherein an injection concentration of the temporary plugging agent is 3% to 4%.

* * * * *